United States Patent [19]

Wen

[11] Patent Number: 4,947,300
[45] Date of Patent: Aug. 7, 1990

[54] CHARACTER AND NUMERAL DISPLAYING DEVICE

[76] Inventor: Hung S. Wen, 5th Fl., No. 87, Sunchiang Road, Taipei, Taiwan

[21] Appl. No.: 444,933

[22] Filed: Dec. 4, 1989

Related U.S. Application Data

[63] Continuation-in-part of Ser. No. 292,994, Jan. 3, 1989.

[51] Int. Cl.$^5$ .............................................. F21L 7/00
[52] U.S. Cl. ...................................... 362/183; 362/27; 362/31; 40/546
[58] Field of Search ...................... 362/26, 27, 31, 330, 362/244; 40/546

[56] References Cited

U.S. PATENT DOCUMENTS

| | | | |
|---|---|---|---|
| 3,131,670 | 5/1964 | Hardesty | 362/27 |
| 4,009,535 | 3/1977 | Stock | 40/546 |
| 4,729,185 | 3/1988 | Baba | 40/546 |
| 4,777,749 | 10/1988 | Leo, Sr. | 40/546 |
| 4,874,228 | 10/1989 | Aho | 362/26 |

FOREIGN PATENT DOCUMENTS 164393 12/1933 Switzerland ........................... 40/546

*Primary Examiner*—James C. Yeung
*Attorney, Agent, or Firm*—Cushman, Darby & Cushman

[57] ABSTRACT

A character and numeral displaying device which, in addition to AC power source, is particularly suitable for use with solar energy, comprises a solar energy converting device for converting solar energy into electrical energy, a battery means for receiving the electrical energy from said solar energy converting device and supplying the electrical energy stored therein, a circuit board means comprising a control circuit for automatic illumination of the character and numeral displaying device in the dark, a lighting means comprising a light source of a lamp bulb or light emitting diode (LED) with the body surface having a displaying device with a plurality of characters and numerals wherein each of the characters and numerals is formed with dot matrix of geometrical figures such as a parallelogram, a circle, or a diamond, the desired character or numeral being created by placing a plurality of suitably shaped shades, a very thin refracting plate being placed flatly below the displaying device or wound around within the lamp body, the outer surface thereof having a plurality of parallel stripes with right angled serrations, the inner surface being smooth, the light from the light source passing through said smooth surface and being refracted to be very uniform light rays from the outer surface such that the characters and numerals desired to be displayed are very clearly and brightly illuminated.

8 Claims, 3 Drawing Sheets

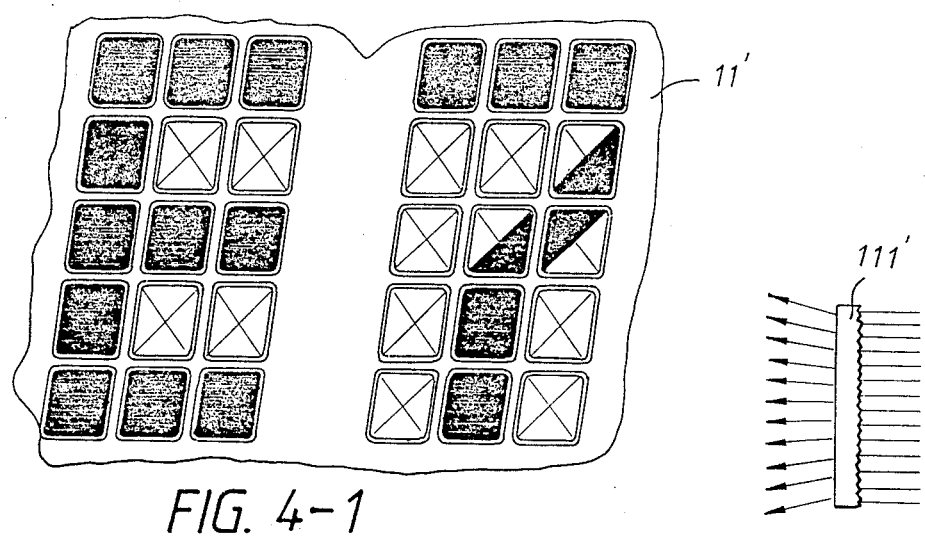
FIG. 4-1
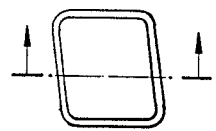
FIG. 4-2A
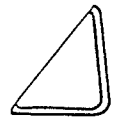
FIG. 4-2B
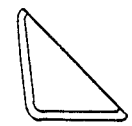
FIG. 4-2C
FIG. 4-3
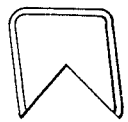
FIG. 4-2D
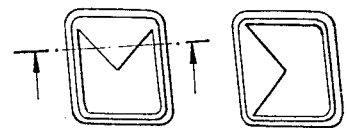
FIG. 4-2E
FIG. 4-2F

CHARACTER AND NUMERAL DISPLAYING DEVICE

BACKGROUND OF THE INVENTION

The present invention is a continuation-in-part of the U.S. patent application Ser. No. 07/292994 filed on Jan. 3, 1989 pending.

Solar energy is a convenient and effective energy source which can be used in light emitting device requiring only low power (there is certainly no problem at all in case where sufficient sunlight is available). In addition to operating on AC power source, the present invention is particularly suitable for utilizing electrical energy converted from solar energy such that uniform and bright illuminating light rays can be produced for character and numeral displaying device with very small power.

SUMMARY OF THE INVENTION

An object of the present invention is to provide a character and numeral displaying device which utilizes solar energy wherein only very little power is required to produce uniform and bright illuminating light for highly efficient character and numeral display by means of multiple refraction by a refracting plate and wherein change of the character and numeral display can be effected by removing or replacing a few shading plates such that the present invention is simple in construction and has economical utilization value.

The present invention can also operate on typical AC power source for character and numeral display with the same result.

BRIEF DESCRIPTION OF THE DRAWINGS

FIG. 2—1 is a front elevation view of an embodiment of the lamp means used in the character and numeral displaying device of the present invention;

FIG. 2—2 is a side elevation view of the lamp body shown in FIG. 2—1;

FIG. 4—1 is an enlarged view showing, in detail, the characters and numerals of the displaying device (11') in the lamp means of the present invention;

FIG. 4—2 is a view showing the shape of a shading plate (14') for use with the displaying device (11') in the lamp means of the present invention;

FIG. 4—3 is a side elevation view of the displaying device (11") shown in FIG. 4—1;

FIG. 5—1 is a view showing another embodiment wherein a round dot matrix is used for the displaying device (11') in the lamp means of the present invention;

FIG. 5—2 is a view showing still another embodiment wherein a diamond dot matrix is used for the displaying device (11') in the lamp means of the present invention.

DETAILED DESCRIPTION OF THE PREFERRED EMBODIMENT

Figure 1:
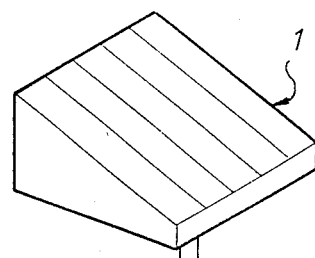
FIG. 1 is a schematic view of a most preferred embodiment of the present invention.

In a preferred embodiment shown in FIG. 1, the present invention comprises a solar energy converting means (1) for converting solar energy into electrical energy; a battery means (2) for receiving the electrical energy from said converting means and supplying the electrical energy stored therein; a circuit means (3) comprising a control circuit (4) for automatic charging of said battery means (2) during the time when sunlight is available and for automatic control of a lamp means (5') to produce illuminating light during the night; said lamp means (5') comprising a light source (6) of a bulb or a light emitting diode for illumination of characters and numerals.

Figures 1, 2:
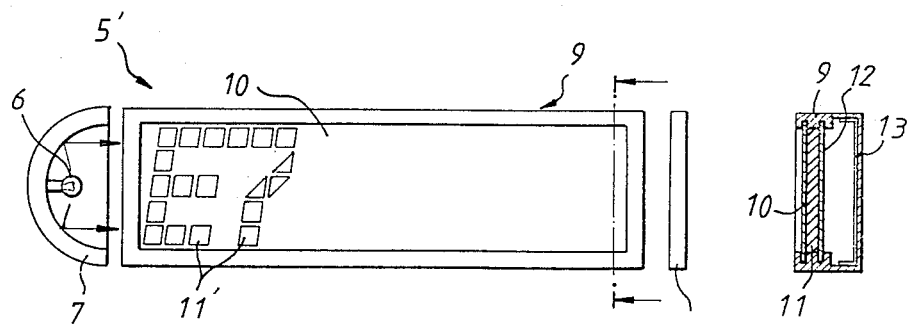

FIG. 2—1 shows an embodiment of the lamp means of the present invention which comprises a light source (6) such as a bulb, a parabolic mirror (7) being disposed on one end of the body (9) of said lamp means, said light source being placed at the focal point of said parabolic mirror such that the light rays are reflected and projected parallelly into said body for illumination so as to effect the display of the displaying device (11') having a plurality of characters and numerals, a reflecting mirror (8) being provided on the other side of said body for reflecting light rays thereinto, a transparent rectangular press plate (10) press-covering immediately on top of the displaying device (11') to securely hold said displaying device, in addition, said parabolic mirror (7) being also capable of serving as said reflecting mirror (8).

Figure 6:
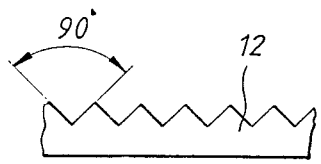
FIG. 6 is an enlarged view showing, in detail, the surface of the refracting plate in the lamp means of the present invention.

FIG. 2—2 is a side elevation view of the body of the lamp means wherein a refracting plate (12) is flatly placed or is wound into the shape of a long barrel below the displaying means in the body, light rays emitted from the light source (6) and reflected by the parabolic mirror (7) passing through into the refracting plate (12), after multiple refraction by the surface thereof (as shown in FIG. 6), uniform and bright light rays being produced to irradiate the characters and numerals. A generally rectangular tin foil (13) is provided below the refracting plate for reflecting the light rays incident thereupon so as to enhance the illumination of the characters and numerals. Rather than using a tin foil, the inner side on the lower portion of the body can be vacuum plated (not shown) for reflection purpose.

Figure 3:
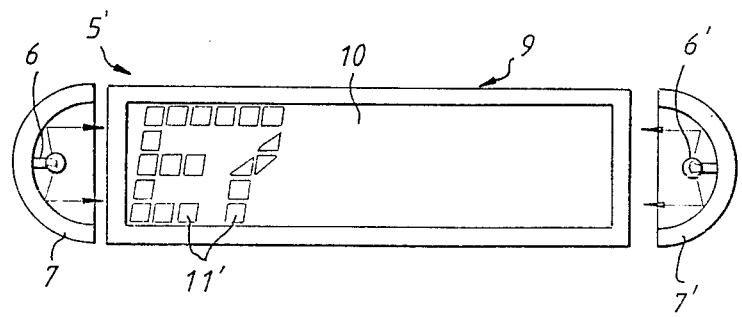
FIG. 3 is a front elevation view of another embodiment of the lamp means used in the present invention.

In another embodiment of the lamp means according to the present invention, the reflecting mirror (8) can be replaced with another light source (6') as shown in FIG. 3 to enhance the illumination of the light rays.

The displaying devices (11') shown in FIG. 4—1 are comprised of a plurality of dot matrixes (matrix units) having the same geometrical shape from which the desired character or numeral can be displayed by having a plurality of shades placed at or removed from appropriate positions on each of the matrixes. In the present embodiment, each of the two displaying devices (11') is a 3×5 dot matrix with each dot being a parallelogram, what displayed being the English letter "E" and the Arabic numeral "7", respectively.

FIG. 4—2 shows the configuration of the shades (14') for use with displaying devices (11') having parallelogrammatic dot matrixes. In general, there are a total of six basic configurations as shown in FIGS. 4—2A, 4—2B, 4—2C, 4—2D, 4—2E and 4—2F, respectively, the profile of the shades being of the same shape (as shown in FIG. 4—2A) or partial shape (as shown in FIGS. 4—2B, 4—2C, 4—2D, 4—2E and 4—2F) as the matrix units.

FIG. 4—3 shows the surface structure (111') of the displaying device (11') wherein the surface below the character and numeral of the displaying device is corrugated such that the character and numeral will be brightly displayed by means of the light rays from the body after multiple refraction (The shades used may be opaque or transparent such that portions having the shades cannot be displayed so as to clearly display the desired characters and numerals, or the portions having no shades cannot be displayed for the same result). According to this principle, the problem of uneven illumination with conventional signboards or marks can thus be overcome.

Figures 1, 5:
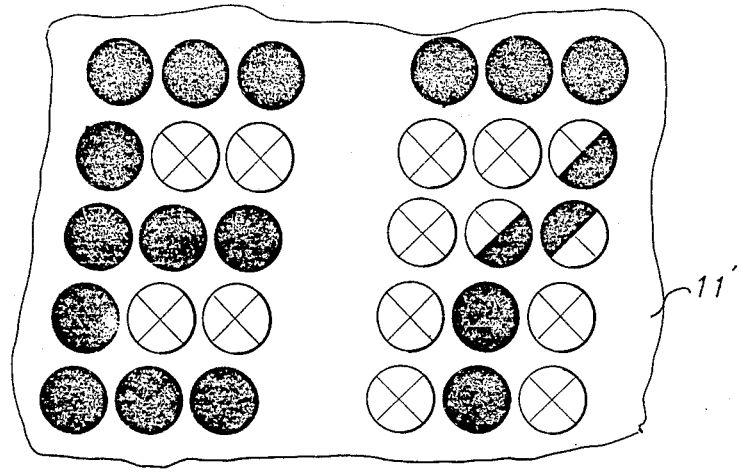
Figures 2, 5:
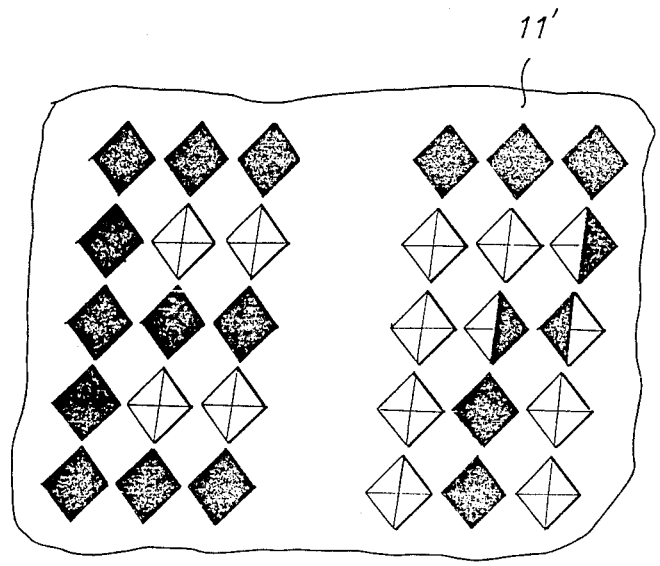

FIG. 5 shows embodiments of the displaying devices (111) having different dot matrixes with a round dot matrix being shown in FIG. 5—1 and a diamond dot matrix in FIG. 5—2, the shades (not shown) thereon being shaped to mate the configuration of said dot matrix units (that is, being the total or partial shape thereof).

FIG. 6 shows the surface configuration of the refracting plate (12) which is a very thin transparent plastic plate. The outer surface has a large number of parallel stripes with right-angled serrations, the arrangement of said serrations being parallel to the light rays from the light source. The inner surface thereof is smooth such that the incident light rays passing the smooth inner surface are projected from the outer surface after multiple refraction, thus enabling the displaying device of the present invention to give very evenly illuminated and bright display.

The power source, such as the solar battery means comprising the converting means (1), the battery means (2) and the circuit board (3), or the AC power source can be incorporated into or placed separately from the lamp means. It is known to those skilled in the art that, in addition to displaying characters and numerals with better results, meaning expressing characters such as the Chinese may also be displayed when more densely arranged dot matrixes (denser than 3×5) are used.

With the present invention, following benefits can be obtained:

(1) By having the refracting plate and the inner surface of the displaying device configured as described above, even and effective display of desired characters and numerals can be achieved with very low power supply such that, in addition to pedestrians, the display can be easily identified by passing drivers or postmen.

(2) The number plate is changeable such that the user can make changes freely by placing a few shades at appropriate positions (by having the shade replaced or removed) to display the desired characters and numerals such that not only the displaying device of the present invention can be manufactured at reduced costs and convenient to use but also the device can be used continuously when it is being on the move.

(3) In addition to the AC power source, the device of the present invention is also particularly suitable for operating on solar energy and can even be used in areas where the sunlight is less than sufficient because of the extremely low power that is required. Furthermore, the device of the present invention is highly efficient by having a control circuit enabling automatic charge of the battery and automatic illumination of the display during the night.

What is claimed is:

1. A character and numeral displaying device comprising:
   a power supply means; and
   a lamp means (5') comprising:
   a light source (6) disposed on one side of a body (9) of said lamp means;
   a reflecting mirror (8) disposed on the other side of the body (9) of said lamp means for reflecting the light rays from said light source;
   a parabolic mirror (7) disposed in the light source which is placed at the focal point of said parabolic mirror such that the light rays from the light source are reflected and projected parallelly into the body (9) of the lamp means; a displaying device (11') comprising a plurality of characters and numerals, each being composed of dot matrixes (matrix units) of the same shape, an inner surface of said displaying device being corrugated for effecting multiple refraction of the light rays; a plurality of shades (14") of suitable shape placed at appropriate positions on each of the dot matrixes for displaying the desired characters and numerals; a transparent rectangular press plate (10) pressly covering over said displaying device (11) for holding purpose; and a very thin planar refracting plate (12) flatly placed below the displaying device (11') in the body of the lamp means, the outer surface thereof having a large number of stripes with right-angled serrations and arranged parallel to the light rays from an light source, the inner surface thereof being smooth for multiple refraction of an light rays from the light source so as to produce even and bright illuminating light rays for displaying the characters and numerals.

2. The character and numeral displaying device according claim 1 wherein said power supply is a solar energy means comprising a converting means (1), a battery means (2) and a control circuit (4) for converting the solar energy into electrical energy which is automatically charged into the battery means or used by the light source (6) to automatically emit light for illuminating the display of the characters and numerals during the night by means of the control circuit.

3. The character and numeral displaying device according claim 1 wherein said power supply is AC power source.

4. The character and numeral displaying device according claim 1 wherein said reflecting mirror serves as another light source (6') and another parabolic mirror (7'), said light source (6') being disposed at the focal point of said another parabolic mirror (7').

5. The character and numeral displaying device according claim 1 further comprising a rectangular tin foil disposed below the refracting plate in said body for reflecting the downwardly projected light rays, thereby to enhance the display of the characters and numerals.

6. The character and numeral displaying device according claim 1 further comprising a vacuum plated layer on the inner surface in the lower portion of said body for reflecting the downwardly projected light rays, thereby to enhance the display of the characters and numerals.

7. The character and numeral displaying device according claim 1 wherein said shades are removed from appropriate positions on each dot matrix in the displaying device for displaying the desired characters and numerals.

8. The character and numeral displaying device according claim 1 wherein said parabolic mirror (7) serves as said reflecting mirror (8).

* * * * *